United States Patent Office 3,262,991
Patented July 26, 1966

3,262,991
CROSS-LINKED REACTION PRODUCT OF AZIRI-DINYL POLYESTER RESINS WITH CYCLIC ANHYDRIDES
Jack C. McClendon, Freeport, and Clarence R. Dick, Lake Jackson, Tex., assignors to The Dow Chemical Company, Midland, Mich., a corporation of Delaware
No Drawing. Filed Mar. 20, 1963, Ser. No. 266,526
13 Claims. (Cl. 260—873)

This invention relates to a new method of cross-linking certain polyester resins and to resins so treated.

Polyester resins containing residues of unsaturated polycarboxylic acids, such as maleic, fumaric, itaconic, citraconic or glutaconic acid, are well known. These contain olefinic double bonds in the polymer chain. The present invention is concerned with such unsaturated polyester resins wherein the olefinic double bonds are activated by adjacent carboxy groups; i.e., those containing the group $$-\overset{R}{\underset{}{C}}=\overset{R}{\underset{}{C}}-\overset{O}{\underset{}{\overset{\|}{C}}}-O-$$

For convenience, such groups will be referred to hereinafter as acryloxy groups because the prototype compound is acrylic acid $$H-\overset{H}{\underset{}{C}}=\overset{H}{\underset{}{C}}-\overset{O}{\underset{}{\overset{\|}{C}}}-O-H$$

According to the present invention, polyester resins containing acryloxy groups can be cross-linked and beneficially modified by a two-step process as follows:

(1) At least some of the acryloxy groups are reacted with an aziridine, whereby an aziridinyl group becomes attached to the acryloxy group:

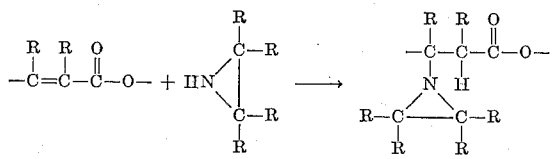

(2) At least some of the aziridine groups are homopolymerized or are copolymerized with a polyfunctional reactant copolymerizable therewith, thus cross-linking the resin.

It is to be understood that in all the formulas herein, each R represents an inert monovalent radical, such as H, alkyl or phenyl. Any such alkyl radicals ordinarily contain not more than about 6, and preferably not more than 2 carbon atoms. Also, it is preferred that on the aziridine ring at least two R's be hydrogen and not more than one be phenyl. It is to be further understood that while the above formulas illustrate the acryloxy group as being an integral part of the "backbone" or main chain of the polymer, it can also be a side-chain, or a part of a side-chain. Also, it can be partially main-chain and partially side-chain. Side-chain acryloxy groups may be illustrated by structures, such as (a) 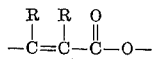

(b) 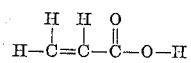

and the like, wherein the long dashes represent the main chain of the polymer. Partial side-chain acryloxy groups may be illustrated by structures such as (c) 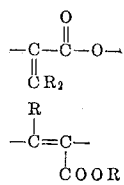

(d) $$-\overset{R}{\underset{}{C}}=\overset{}{\underset{}{C}}-\\ \overset{}{\underset{}{COOR}}$$

and (e) 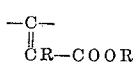

Having the benefit of the concepts disclosed herein, those skilled in the art will be able to provide polyesters having the above and other equivalent structures. Thus, the structure (a) is easily prepared by the reaction of acrylic acid, acrylic anhydride or equivalent, with any polymer having esterifiable hydroxyl groups. Similarly, (b) can be made by esterifying such hydroxyl-bearing polymer with maleic or fumaric acid or a half-ester of such acid. Polymers of the structure (c) are obtained by using itaconic acid in making a linear polyester. Polymers containing the structure (d) can be made by the dehydrohalogenation of a poly(α-haloacrylate). The structure (e) can be produced by condensing a polymer containing aldehyde or ketone groups with an ester of acetic, malonic or propionic acid. Conversely, it can be made by condensing an ester of glyoxylic, pyruvic or acetonedicarboxylic acid with a polymer containing active methylene groups.

The addition of aziridine to certain unsaturated polyesters of the above-defined type has been reported by Huttel et al., Farbe und Lack, 67, 71, 1961. Huttel also described the cross-linking of the aziridinyl resins by treatment with alkyl arylsulfonates. The reaction involved in the latter process is the homopolymerization of the aziridinyl groups and is catalyzed by the sulfonate.

According to the present invention, aziridinyl polyester resins, i.e., polyester resins to which are attached a plurality of 1-aziridinyl groups, are modified and improved by reaction with a cyclic anhydride of a polycarboxylic acid. By "cyclic anhydride" is meant that the two carbon atoms of the anhydride group are members of a ring, as distinguished from merely being attached to a ring. Thus, phthalic anhydride is a cyclic anhydride but benzoic anhydride is not. Other suitable cyclic anhydrides include maleic anhydride, succinic anhydride, alkenylsuccinic anhydrides, itaconic anhydride, citraconic anhydride glutaconic anhydride, glutaric anhydride, phthalic anhydride, dihydro-, tetrahydro- and hexahydrophthalic anhydrides and the alkyl-, alkoxy- and halogen-substituted derivatives of the foregoing.

While the above-disclosed monomeric cyclic anhydrides of polycarboxylic acids are useful in practicing the present invention, and for certain purposes are the preferred anhydrides, the anhydrides that are generally preferred in practicing the present invention are polymeric anhydrides; i.e., polymeric materials containing a plurality of cyclic anhydride groups. Such polymeric anhydrides are well known in the form of linear copolymers of maleic anhydride with a vinyl monomer copolymerizable therewith. Among the known resins of this type are the copolymers of maleic anhydride with styrene, methylstyrene chlorostyrene, vinyltoluene, ethylene, propylene, acrylonitrile, vinyl chloride, vinyl ethers, vinyl esters, acrylic esters and the like, as well as the copolymers of alkylmaleic anhydride, chloromaleic anhydride or itaconic anhydride with the above comonomers. Polymeric cyclic andrides useful in practicing the invention can also be made by the dehydration of polyacrylic acid or of copolymers of acrylic acid with other vinyl monomers. Other suitable anhydrides and processes for making such anhydrides will be apparent to those skilled in the art.

The chemical reactions involved in the practice of our invention are not fully understood but it is believed that at least a portion of the reactive groups react as follows:

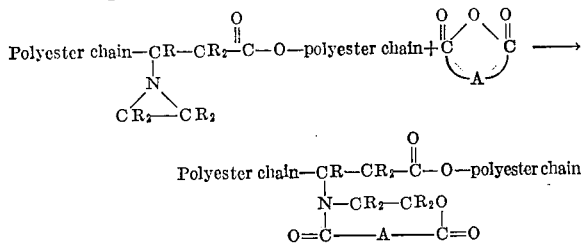

wherein A represents the residue of the cyclic anhydride.

From the above idealized and over-simplified reaction mechanism, it is apparent that the anhydride molecule becomes attached to the aziridine moiety through two linkages. Since these two points of attachment need not be on a single aziridine residue or a single anhydride residue but could be on two different residues of either type, it is apparent that a monomeric cyclic anhydride can cross-link a linear polyaziridinyl polymer. It is, of course, evident that a polyanhydride must always cross-link a polyaziridine with which it reacts. In practice, it has been found that monomeric anhydrides produce relatively light cross-linkage while poly-anhydrides produce a higher degree of cross-linkage.

The degree of cross-linkage can also be controlled by (1) the frequency of aziridinyl radicals on the polyester chain, (2) the proportions of anhydride groups to aziridinyl groups, and (3) the number or frequency of anhydride groups on the anhydride-bearing molecule. As to (1), it is preferred, though not essential, that a mole of aziridine be reacted with each acryloxy group in the unsaturated polyester resin used in making the polyaziridinyl resin. Hence, the preferred way of controlling the frequency of aziridinyl groups is by controlling the frequency of acryloxy groups in the polyester. This is done, of course, by choosing suitable proportions of the appropriate unsaturated polycarboxylic acid to be used in making the polyester. As to (2), it is generally preferred, though not essential, to use an amount of anhydride that is stoichiometrically equivalent to the aziridinyl groups in the polyester; i.e., one anhydride group for each aziridinyl group. Minor variations of 50 percent or more in either direction are often desirable to provide for the reaction of any incidental amino, hydroxyl or carboxyl groups that may be present in either reactant. Thus, it is usually desirable that the finished product have as few of these reactive groups as possible in order to improve its physical and chemical properties, especially its sensitivtiy to water and organic fluids.

In practicing the invention, the aziridinyl polyester resin is mixed with the cyclic anhydride of a polycarboxylic acid and reaction between the two is effected by merely allowing the mixture to stand at ordinary temperature for sufficient time or, preferably, heating the mixture at a moderate temperature for a shorter time. The time and temperature required for curing are inversely related and depend to a considerable degree on the functionality of the two materials; i.e., on the number and frequency of aziridinyl and anhydride groups in the respective materials. Also, the reactivity of these groups varies somewhat, depending on the structure of the functional groups; i.e., on the number and nature of the other groups or substituents on the aziridinyl or anhydride rings. In general, a significant and useful degree of reaction (cure) is obtained within a few hours to a few days at ordinary temperatures or a few minutes at elevated temperatures such as 50–150° C.

The aziridinyl polyester and the cyclic anhydride can be physically mixed by any convenient technique. Thus, they may be ground together or they may be blended in the liquid state. For many purposes, such as the coating of surfaces or the impregnation of porous materials, the final products are most conveniently used in the form of solutions in organic solvents. For these, it is especially convenient to mix the two components in a suitable solvent. The common paint, varnish and lacquer solvents are generally useful for the purpose. They include aliphatic, cycloaliphatic and aromatic hydrocarbons, halo-hydrocarbons, ethers, esters and ketones.

The practice of the invention can be conveniently divided into three phases: (1) preparation of the unsaturated polyester resin; (2) conversion of this resin to the polyaziridinyl resin by reaction with an aziridine; and (3) cross-linking of the aziridinyl resin by reaction with a cyclic anhydride of a polycarboxylic acid.

UNSATURATED POLYESTER RESIN

As pointed out hereinbefore, suitable resins are commercially available or can be made by known methods. The requisite unsaturation must be in the form of double bonds which are activated by adjacent carboxy groups; i.e., in the form of acryloxy groups as herein defined. Such groups are conveniently provided by unsaturated acids such as maleic, fumaric, itaconic, citraconic, chloromaleic and glutaconic acid or the corresponding anhydride, or the like. It is not necessary that all of the polycarboxylic acid component of the polyester resin be unsaturated. A sufficient frequency of acryloxy groups is provided if at least about 25 mole percent, and preferably at least about 50 mole percent of the total acid is of the type to provide acryloxy groups. The remainder may be any saturated, unsaturated or aromatic polycarboxylic acid that is useful in making polyester resins, such as for instance, phthalic, succinic, adipic or sebacic acid, dimerized fatty acid, or the like.

The polyol component of the polyester resin may be of any of those useful in making polyester resins. Among the commonly used ones are ethylene, propylene, butylene, hexylene, diethylene, dipropylene, polyethylene and polypropylene glycols, glycerol, the bis(2-hydroxyalkyl) ethers of bisphenol A and halogenated bisphenol A, and the like.

Methods for esterifying the above acids and polyols are well known in the art.

AZIRIDINYL POLYESTER RESINS

Aziridine and its homologs and analogs having a hydrogen on the nitrogen atom of the aziridine ring readily react on contact, even at ordinary temperatures, with unsaturated polyester resins containing acryloxy groups. In this reaction the aziridine moiety becomes attached through its nitrogen atom to the β-carbon atom of the acryloxy group, thus converting the latter to a β-aziridinyl-propionoxy group. Since the polyester usually contains residual acid groups, which groups will not only react with the aziridine but also catalyze polymerization of the aziridine, it is desirable to make certain that all such acidity is neutralized before contacting the resin with the aziridine. This is conveniently done by the addition of a tertiary amine. The trialkylamines are preferred, especially those wherein the alkyl radicals contain not more than 4 carbon atoms. Amines also catalyze the reaction of the aziridine with the unsaturated polyester; hence it is convenient and preferable to add to the polyester, prior to adding the aziridine, an excess of tertiary amine over the amount required to neutralize any residual acidity. The amount of such excess is not critical, a catalytic amount of the order of 1 to 25 percent by weight being sufficient.

The aziridine is suitably added to the polyester at a slow rate and with adequate stirring and, if necessary, cooling. The reaction is exothermic and overheating should be avoided, since it results in darkening of the product and may even result in cross-linkage. It is preferred to dissolve either the polyester or the aziridine, and preferably both, in an inert, anhydrous, volatile solvent, thus facilitating mixing and temperature control. For many purposes the resin will be used in such solvent, as, for instance, in applying it as a surface coating.

It has been found generally preferable to use at least the amount of aziridine theoretically required to react with all the acryloxy groups in the polyester. For best solvent resistance in the final cross-linked resin the amount of aziridine should be somewhat in excess of the theoretical. Up to about 50 percent excess may be advantageously used, though usually about 25 to 40 percent excess is preferred. To assure complete reaction, the mixture may be gently heated, as for example, at 50-100° C. for an hour.

CROSS-LINKING THE AZIRIDINYL POLYESTER RESIN

The cyclic anhydride of a polycarboxylic acid that is used to cross-link the aziridinyl polyester resin should be thoroughly mixed with the polyester before appreciable reaction occurs since once cross-linkage begins further mixing is impaired. For this reason, dilution of either the resin or the anhydride, or, preferably, both with an inert, anhydrous, volatile solvent is highly desirable. The amount of anhydride used should be at least about 50 percent of that theoretically required, calculating one anhydride group per aziridine group, and it is preferred to use about 75-125 percent, or even up to 200 percent of the theoretical amount.

Since the anhydride reacts rapidly with the aziridinyl resin at moderately elevated temperatures, the two should be mixed at or near ordinary temperatures and, after mixing, exposure to heat prior to the desired cure should be avoided.

When the solvent is removed from the aziridinyl resin containing the anhydride curing agent, the curing action begins to proceed slowly at ordinary temperatures or much more rapidly at moderately elevated temperatures. Thus, surface coatings cure within a few hours to a few minutes at temperatures of the order of 80-150° C. Suitable curing schedules are easily determined in each particular application.

The practice of the invention is illustrated by the following examples.

Table I summarizes the production of a series of aziridinyl polyester resins of the type useful in the present invention. The table shows the number of moles of polycarboxylic acids or anhydrides and of glycols or polyols used in making the unsaturated polyester resin containing acryloxy groups and the moles of aziridine which were then added per acryloxy group of the unsaturated resin, thus forming the aziridinyl polyesters.

*Table I*

AZIRIDINYL RESIN COMPOSITIONS

| Example | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Maleic anhydride | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Phthalic anhydride | | 0.5 | 1.0 | 0.5 | | | | | 1.0 | 1.0 | 1.0 | | 0.5 | 0.5 | 0.5 | 0.5 | 0.5 | 0.5 | 0.5 | 0.5 | |
| Adipic acid | 1.0 | 0.5 | | 0.5 | | 1.0 | 1.0 | | 1.0 | 1.0 | 1.0 | | 0.5 | 0.5 | 0.5 | 0.5 | 0.5 | 0.5 | 0.5 | 0.5 | 0.5 |
| Empol 1018a [1] | | | | | 0.5 | | | | | | | | | | | | | | | | |
| Oxalic acid | | | | | | | | 1.0 | | | | | | | | | | | | | |
| Tetrahydrophthalic anhydride | | | | | | | | | | | | | | | | | | | | | 0.5 |
| Ethylene glycol | 2.2 | 1.1 | 1.1 | 0.8 | 0.8 | 0.9 | 0.9 | 1.1 | 1.65 | 1.65 | 1.65 | 1.1 | 1.1 | 1.1 | 1.1 | 1.1 | 1.1 | 1.1 | 1.1 | 1.1 | 1.1 |
| Propylene glycol | | 1.1 | 1.1 | 0.8 | 0.8 | 0.9 | 0.9 | 1.1 | 1.65 | 1.65 | 1.65 | | 1.1 | 1.1 | | | | | 1.1 | 1.1 | 1.1 |
| Diethylene glycol | | | | 0.2 | | | | | | | | | | | | | | | | | |
| Glycerine | | | | | 0.4 | | | | | | | | | | | | | | | | |
| 1,3-propanediol | | | | | | | | | | | | | | | | | | | | | |
| 1,4-butanediol | | | | | | | | | | | | | | | 1.1 | | | | | | |
| 1,5-pentanediol | | | | | | | | | | | | | | 1.1 | | | | | | | |
| 1,4-cyclohexanediol | | | | | | | | | | | | | | | | | 1.1 | | | | |
| 2,2'-isopropylidene-bis(2,6-dibromo-p-phenyleneoxy)diethanol | | | | | | | | | | | | | | | | | | 1.1 | | | |
| E-400b [2] | | | | 0.4 | | | 0.35 | | | | | | | | | | | | | | |
| Aziridine | 1.35 | 1.35 | 1.35 | 1.35 | 1.35 | 1.05 | 1.35 | 1.00 | 1.35 | 1.00 | 0.75 | 1.00 | 1.00 | 1.20 | 1.35 | 1.35 | 1.35 | 1.35 | 1.52 | | 1.35 |
| 2-methylaziridine | | | | | | | | | | | | | | | | | | | | 1.35 | |

[1] A dimerized fatty acid sold by Emery Industries.
[2] Polyethylene glycol of molecular weight 400.

The resins shown in Table I were cured with various cyclic anhydrides of polycarboxylic acids by the general procedure described hereinbefore. In general, the resin and anhydride were each dissolved in methyl ethyl ketone and maleic anhydride wherein the molar ratio of the two or other inert solvent, the two solutions were mixed, films were cast on glass from the resulting solution and were then cured by heating for 30-60 minutes at 125-135° C. The films were then tested for hardness by the pencil test and for solvent resistance by putting six drops of solvent on surface of film, covering with a watch glass and allowing to stand for 30 minutes. They were then inspected for softening, blistering, etc. In one such series of test, the aziridinyl polyester of Example 2 was cured with a variety of anhydrides, the results being shown in Table II. The second column of the table shows the amount of curing agent used, calculated as percent of theory, the theoretical amount being one cyclic anhydride group per aziridinyl group in the resin.

Table II
PROPERTIES OF POLYESTER COMPOSITION OF EXAMPLE 2 CURED WITH VARIOUS CURING AGENTS

| Curing Agent | Percent of Theory | Cure Time, min. | Cure Temp., °C | Color [1] | Pencil Hardness [2] | Effect of Solvents | | |
|---|---|---|---|---|---|---|---|---|
| | | | | | | Water | Acetone | Xylene [3] |
| Phthalic anhydride | 50 | 30 | 125 | SlY | 3H | BS | Bl | NE. |
| | 70 | 30 | 125 | SlY | 5H | BS | BS | NE. |
| | 90 | 30 | 125 | SlY | 5H | BS | Bl | NE. |
| | 100 | 30 | 125 | SlY | 5H | S | S | NE. |
| | 100 | 30 | 125 | SlY | 5H | S | Bl | NE. |
| | 130 | 30 | 125 | SlY | 5H | S | S | NE. |
| | 150 | 30 | 125 | SlY | 5H | S | Bl | NE. |
| Maleic anhydride | 50 | 30 | 125 | SlY | 2H | Bl | Bl | NE. |
| | 70 | 30 | 125 | SlY | 4H | S | S | NE. |
| | 90 | 30 | 125 | SlY | 6H | BS | S | NE. |
| | 100 | 30 | 125 | SlY | 6H | BS | S | NE. |
| | 110 | 30 | 125 | SlY | 6H | Bl | Bl | NE. |
| | 130 | 30 | 125 | SlY | 6H | Bl | S | NE. |
| | 150 | 30 | 125 | SlY | 5H | Bl | BS | NE. |
| Dodecenyl succinic anhydride | 50 | 45 | 135 | SlY | H | BS | Bl | S. |
| | 70 | 45 | 135 | SlY | H | BS | Bl | S. |
| | 90 | 45 | 135 | SlY | 2H | S | Bl | Bl. |
| | 100 | 45 | 135 | SlY | 3H | S | Bl | Bl. |
| | 110 | 45 | 135 | SlY | 3H | S | Bl | Bl. |
| | 130 | 45 | 135 | SlY | 3H | S | Bl | Bl. |
| | 150 | 45 | 135 | SlY | 3H | S | Bl | Bl. |
| Chlorendic anhydride | 75 | 45 | 135 | SlY | 4H | NE | Bl | S. |
| | 100 | 45 | 135 | SlY | 4H | NE | Bl | S. |
| | 125 | 45 | 135 | SlY | 4H | NE | Bl | S. |
| Styrene-maleic anhydride copolymer (92:8) [4] | 50 | 30 | 125 | Cloudy | 5H | NE | S | NE. |
| | 70 | 30 | 125 | do | 5H | NE | S | NE. |
| | 90 | 30 | 125 | do | 5H | NE | NE | NE. |
| | 100 | 30 | 125 | do | 2H | NE | S | S. |
| | 110 | 30 | 125 | do | 2H | NE | BS | S. |
| | 130 | 30 | 125 | do | 2H | NE | BS | S. |
| | 150 | 30 | 125 | do | -H | NE | BS | NE. |
| Styrene-maleic anhydride copolymer (65:35) | 100 | 30 | 125 | do | 6H | NE | NE | NE. |
| Styrene-maleic anhydride copolymer (58:42) | 75 | 30 | 125 | do | 6H | NE | NE | NE. |
| | 100 | 30 | 125 | do | 6H | NE | NE | NE. |
| | 125 | 30 | 125 | do | 6H | NE | NE | NE. |
| Styrene-maleic anhydride copolymer (50:50) | 50 | 30 | 125 | Col | 6H | NE | NE | NE. |
| | 70 | 30 | 125 | Col | 6H | NE | NE | NE. |
| | 90 | 30 | 125 | Col | 7H | NE | NE | NE. |
| | 100 | 30 | 125 | Col | 7H | NE | NE | NE. |
| | 110 | 30 | 125 | Col | 7H | NE | NE | NE. |
| | 130 | 30 | 125 | Col | 7H | NE | NE | NE. |
| | 150 | 30 | 125 | Col | 7H | NE | NE | NE. |

[1] SlY=slightly yellow, Col=colorless.
[2] Hardness measured by scratching the film surface with a pencil sharpened to a truncated cone. Pencil hardness is film hardness.
[3] NE=no effect, S=softened, BS=badly softened, Bl=blistered.
[4] Ratios are mole ratios of styrene to maleic anhydride.

All the resins shown in Table I were cured satisfactorily with several proportions of the same curing agent, these proportions varying from 0.60 to 1.90 times the theoretical amount required to react with all the aziridine groups. The curing agent was a commercial copolymer of styrene and maleic anhydride wherein the molar ratio of the two monomers was 1:1 (SMA-1000A, sold by Sinclair Petrochemicals, Inc.). Table III shows the proportions of this curing agent that were tested and found satisfactory and the pencil hardness of the resin cured with 75–125 percent of the theoretical amount of curing agent. In general, the hardness varied little if any with the proportions of curing agent used. Results are shown in Table III.

Table III
RESIN COMPOSITIONS WITH PREFERRED CURING AGENT

| Resin of Example | 1 | 2 | 3 | 4 | 5 | 6 | 7 | 8 | 9 | 10 |
|---|---|---|---|---|---|---|---|---|---|---|
| Curing agent (1:1 copolymer of styrene and maleic anhydride). | 1.02 to 1.69. | 1.02 to 1.69. | 1.02 to 1.69. | 1.02 to 1.69. | 1.02 to 1.69. | 0.70 to 1.36. | 1.02 to 1.69. | 0.75 to 1.25. | 1.02 to 1.69. | 0.75 to 1.25. |
| Pencil hardness | 5H | 6H | 7H | 6H | 5H | 3H | 3H | 2H | 3H | 2H. |

| Resin of Example | 11 | 12 | 13 | 14 | 15 | 16 | 17 | 18 | 19 | 20 | 21 |
|---|---|---|---|---|---|---|---|---|---|---|---|
| Curing Agent (1:1 copolymer of styrene and maleic anhydride). | 0.60 to 0.95. | 0.75 to 1.25. | 0.75 to 1.25. | 0.95 to 1.50. | 1.02 to 1.69. | 1.02 to 1.69. | 1.02 to 1.69. | 1.02 to 1.69. | 1.14 to 1.90. | 1.02 to 1.69. | 1.02 to 1.69. |
| Pencil hardness | H | 6H | 5H | 4H | 6H | 6H | 5H | 6H | 6H | 5H | 5H. |

All the polyesters of Table I were reacted with aziridine or 2-methylaziridine and the resulting aziridinyl polyesters were cured with the theoretical amount of 1:1 styrene-maleic anhydride copolymer (SMA-1000A) by heating films of the resin mixture at 80° C. for 30 minutes. The cured films were then tested for solvent resistance as set forth in Table II. Results are tabulated in Table IV.

Table IV
SOLVENT RESISTANCE OF RESIN CURED [1] WITH SMA-1000A

| Polyester No. | Mole Percent Maleic (Acid Bases) | Moles Aziridine Per Mole Maleic | Water | Acetone | Toluene | Ethylene Chloride | Ethanol |
|---|---|---|---|---|---|---|---|
| 1 | 50 | 1.35 | NE | NE | NE | NE | NE. |
| 2 | 50 | 1.35 | NE | NE | NE | NE | NE. |
| 3 | 50 | 1.35 | NE | NE | NE | NE | NE. |
| 4 | 50 | 1.35 | NE | NE | NE | NE | NE. |
| 5 | 66 | 1.35 | NE | NE | NE | NE | NE. |
| 6 | 50 | 1.05 | NE | NE | NE | NE | SlS. |
| 7 | 50 | 1.35 | S | S | S | S | S. |
| 8 | 50 | 1.00 | S | Bl | NE | S | S. |
| 9 | 33 | 1.35 | NE | S | SlS | SlS | S. |
| 10 | 33 | 1.00 | S | S | SlS | Bl | Bl. |
| 11 | 33 | 0.75 | S | S | SlS | Bl | Bl. |
| 12 | 100 | 1.00 | NE | NE | NE | NE | NE. |
| 13 | 50 | 1.00 | NE | S | NE | SlS | SlS. |
| 14 | 50 | 1.20 | NE | Bl | NE | SlS | SlS. |
| 15 | 50 | 1.35 | NE | NE | NE | NE | NE. |
| 16 | 50 | 1.35 | NE | NE | NE | NE | NE. |
| 17 | 50 | 1.35 | NE | NE | NE | S | NE. |
| 18 | 50 | 1.35 | NE | NE | NE | NE | NE. |
| 19 | 50 | 1.52 | NE | NE | NE | NE | NE. |
| 20 | 50 | [2] 1.35 | NE | Bl | NE | Bl | NE. |
| 21 | 50 | 1.35 | NE | NE | NE | NE | NE. |

[1] Cured 30 minutes at 80° C.  [2] Propylenimine.

We claim:

1. The process for making a cross-linked resin comprising (1) reacting by contacting an aziridine having the formula

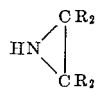

wherein each R represents a radical selected from the group consisting of hydrogen, alkyl radicals containing up to 6 carbon atoms and the phenyl radical, with an unsaturated polyester resin containing acryloxy groups, thus to form a polyaziridinyl polyester and (2) reacting by contacting said polyaziridinyl polyester with a cyclic anhydride of a polycarboxylic acid.

2. The process of claim 1 wherein the unsaturated polyester resin contains a plurality of groups having the formula

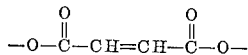

3. The process of claim 1 wherein the anhydride is a copolymer of styrene and maleic anhydride.

4. The process of claim 3 wherein the copolymer contains about 8 to 50 mole percent of maleic anhydride.

5. A cross-linked polyester resin made by the process of claim 1.

6. A resin as claimed in claim 5 wherein the anhydride is phthalic anhydride.

7. A resin as claimed in claim 5 wherein the anhydride is a copolymer of maleic anhydride.

8. A resin as claimed in claim 5 wherein the anhydride is a copolymer of maleic anhydride and at least one other monomer copolymerizable therewith.

9. A resin as claimed in claim 8 wherein the other monomer is styrene.

10. A resin as claimed in claim 5 wherein the anhydride is a copolymer of styrene and maleic anhydride and contains 8 to 50 mole percent of maleic anhydride.

11. The process of claim 1 wherein the unsaturated polyester resin comprises the reaction product of an unsaturated dicarboxylic acid and a glycol.

12. The process of claim 11 wherein the dicarboxylic acid is maleic acid and the glycol is an alkylene glycol of 2–6 carbon atoms.

13. The resin produced by the process of claim 11.

References Cited by the Examiner
UNITED STATES PATENTS

| | | | |
|---|---|---|---|
| 2,988,539 | 6/1961 | Cohen et al. | 260—78.5 |
| 3,107,427 | 10/1963 | Schmitt et al. | 260—873 |

MURRAY TILLMAN, *Primary Examiner.*

J. T. GOOLKASIAN, *Assistant Examiner.*